United States Patent [19]

Fowler et al.

[11] Patent Number: 5,694,286
[45] Date of Patent: Dec. 2, 1997

[54] LIGHTNING PROTECTION DEVICE

[76] Inventors: William J. Fowler; Benjamin P. Fowler, both of 2162 Gulf Terminal Dr., P.O. Box 230767, Houston, Tex. 77223-0767

[21] Appl. No.: 717,960

[22] Filed: Sep. 23, 1996

[51] Int. Cl.$^6$ ................................................. H01H 47/00
[52] U.S. Cl. .......................... 361/220; 361/212; 361/213; 361/229; 361/231; 174/7
[58] Field of Search .......................... 361/212, 220, 361/225, 222, 213, 215, 216, 229–231, 233; 307/91; 174/4 C, 4 R, 5 R, 6, 7

[56] References Cited

U.S. PATENT DOCUMENTS

| | | | |
|---|---|---|---|
| 4,180,698 | 12/1979 | Carpenter, Jr. | 361/220 |
| 4,540,844 | 9/1985 | Sautereau et al. | 174/4 R |
| 4,605,814 | 8/1986 | Gillem | 174/4 R |

*Primary Examiner*—Jeffrey A. Gaffin
*Assistant Examiner*—Sally C. Medley
*Attorney, Agent, or Firm*—Harrison & Egbert

[57] ABSTRACT

A lightning protection apparatus having a tower which is grounded to the earth, an electronic device mounted onto an area adjacent a top of the tower, and a negative ion production device electrically connected to the area of the top of the tower. The negative ion production device serves to produce solely negative ions around and over the electronic device. An auger rod engages the earth so as to be conductively connected to the earth, and an electrical line serves to connect the auger rod to the tower. A shield member is connected to the tower and extends over the electronic device. The negative ion production device is connected to the shield member so as to pass negative ions through the shield member. The negative ion production device can be one or more batteries that are connected together and having a negative terminal connected to the tower and a positive terminal connected to the electronic device.

12 Claims, 3 Drawing Sheets

LIGHTNING PROTECTION DEVICE

TECHNICAL FIELD

The present invention relates to apparatus for protecting towers and/or structures from lightning strikes. More particularly, the present invention is a preventive device for avoiding lightning strikes.

BACKGROUND ART

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modern electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning. It is well known that lightning is particularly attracted to areas of positive ions and is repelled by areas of negative ions. Since the electronic devices at the top of towers often operate on AC power, an attractive source of positive ions is generated at the top of the tower.

Whenever lightning strikes a tower, an enormous amount of damage is created. Typically, the electronic device at the top of the tower is completely destroyed by the lightning. Furthermore, the structure of the tower and other associated electronics at the top of the tower can become damaged. Repair efforts on the tower are often time consuming and expensive. Typically, complete replacement of the electronic device at the top of the tower is required. As such, it is very important to develop a device which resists or prevents lightning strikes.

It is an object of the present invention to provide a lightning protection device that effectively "hides" the object from lightning strikes.

It is another object of the present invention to provide a lightning protection apparatus that serves to avoid the damage caused by lightning strikes.

It is a further object of the present invention to provide a lightning protection device that is easy to install and relatively inexpensive.

It is a further object of the present invention to provide a lightning protection device that can be retrofitted to existing tower and building structures.

These and other objects and advantages of the present invention will become apparent from a reading of the attached specification and appended claims.

SUMMARY OF THE INVENTION

The present invention is a lightning protection apparatus that comprises a tower which is grounded to the earth, an electronic device mounted onto an area adjacent a top of the tower, and a negative ion production device electrically connected to an area adjacent to the top of the tower. The negative ion production device serves to produce solely negative ions around or over the electronic device.

In the present invention, the tower is electrically grounded to the earth by using an auger rod. The auger rod engages the earth so as to be conductively connected to the earth. An electrical line is connected to the auger rod and is conductively connected to the tower. In particular, a plurality of auger rods engage the earth so as to be conductively connected to the earth and are arranged in a geometric configuration around the tower.

In one embodiment of the present invention, a shield member is connected to the tower and extends over the electronic device. The negative ions pass through the shield member. The negative ion generation device includes a DC power source having a negative terminal electrically connected to the shield member. The DC power source includes at least one battery having a DC output of at least 48 volts. A resistor is connected to a positive terminal of the DC power source. The resistor has a resistance capacity equal to or greater than the DC output of the DC power source. The resistor is connected in series with the shield member. The resistor serves to resist a passage of positive ions to the shield member. A battery charger is electrically connected to the DC power source. The battery charger is powered by AC power. The battery charger serves to recharge the DC power source. The charger and the DC power source are positioned at a bottom of the tower. The DC power source has an electrical line connected to the shield member. The electrical line is electrically insulated from the tower. In this embodiment of the present invention, the shield member has an area at least twice the surface area of the electronic device. The shield member is positioned no more than two vertical feet above the electronic device. The shield member is electrically insulated from the electronic device. The shield member is supported over the electronic device and from the tower by a non-conductive frame. In particular, in the present invention, the electronic device is a camera which is mounted onto a top of the tower. This camera, in this embodiment of the present invention, is powered by AC power.

DETAILED DESCRIPTION OF THE INVENTION

Figure 1:
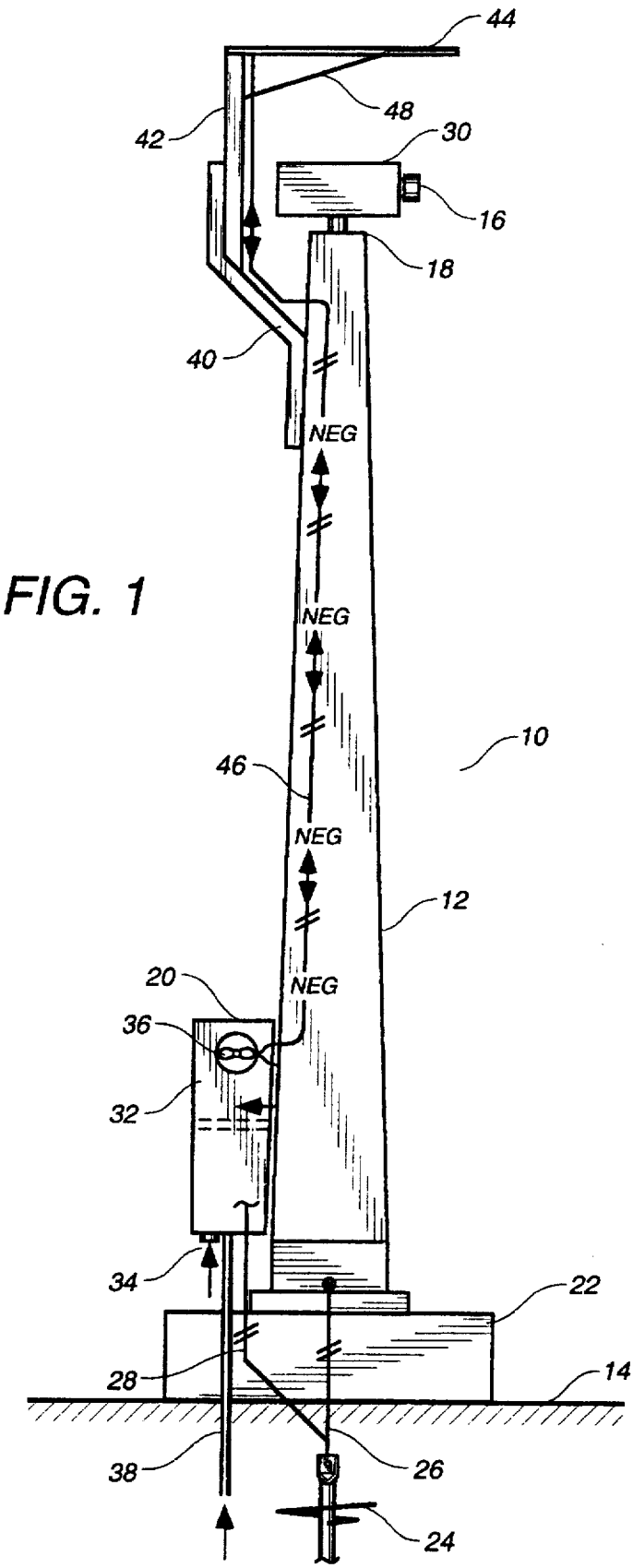
FIG. 1 is a side elevational view of the preferred embodiment of the lightning protection device of the present invention.

Referring to FIG. 1, there is shown at 10 the lightning protection apparatus in accordance with the teachings of the present invention. The lightning protection apparatus 10 includes a tower which is grounded to the earth 14, an electronic device 16 which is mounted onto an area adjacent to the top 18 of the tower 12, and a negative ion production device 20 which is electrically connected to the area adjacent to the top of the tower 12. In the present invention, the negative ion production device 20 serves to produce solely negative ions over and around the electronic device 16.

As can be seen in FIG. 1, the tower 12 is formed of a steel material. The tower 12 is electrically conductive from the base 22 to the top 18. The base 22 is supported on the earth 14. The negative ion production device 20 is mounted to a surface of the tower 12 adjacent to the base 12.

In FIG. 1, an auger rod 24 engages the earth 14 so as to be conductively connected to the earth. A more detailed view of the auger rod 24 is shown in FIG. 5. A carbon electrolyte is placed over the auger rod 24 as it enters the earth. Such a carbon electrolyte establishes a strong conductive connection to the earth. An electrical line 26 extends from the auger rod 24 so as to be in electrical contact with the tower 12 adjacent to the base 12. Also, an electrical line 28 extends from the auger rod 24 so as to be in electrical connection with the negative ion production device 20. As will be described hereinafter, a plurality of auger rods 24 are placed in the earth so as to form a geometric pattern around the tower 12. The use of the auger rod 24 in the earth 14 serves to neutralize the charge at the base of the tower. The electrical line 26 which extends from the auger rod 24 to the tower 12 should have a suitable capacity so as to pass electrical charges from the tower 12. In particular, the electrical line 26 is a 350 mcm wire.

The electronic device 16 is a camera which is rotatably mounted to the top 18 of the tower 12. Although the camera 16 is illustrated in FIG. 1, various other electronic apparatus, such as transmitters and/or receivers, can be mounted onto the top 18 of the tower 12. The present invention should not be limited to the illustration of the camera 16. The camera 16 will have a top surface 30 thereon. In this embodiment of the present invention, the tower 12 is electrically conductive from the base 12 to the camera 16. The camera 16 is powered, in a conventional manner, with AC power.

Importantly, the apparatus 10 includes the negative ion production device 20. FIG. 1 shows that the negative ion production device 20 is contained within a stainless steel or fiberglass enclosure 32. An air intake port 34 is formed at the bottom of the enclosure 32. A fan 36 is positioned on the enclosure 32 so as to draw air through the intake port 34 and through the interior of the enclosure 32. As will be described hereinafter, the enclosure 32 contains four twelve-volt batteries connected in series. A 120-volt charger is also mounted within the enclosure 32. The enclosure 32 is directly mounted onto the surface of the tower 12. A 120-volt, 20 amp AC power line 38 will extend into the enclosure 32 so as to provide power for the battery charger (to be described hereinafter).

As can be seen in FIG. 1, a steel frame member 40 is affixed to a surface of the tower 12 and extends upwardly therefrom. An electrically insulating fiberglass beam 42 is connected to the frame 40 and extends upwardly therefrom. A shield member 44 is affixed to the fiberglass beam 42 so as to extend horizontally outwardly therefrom. In particular, the shield 44 will extend over the top surface 30 of the camera 16. The negative ion production device 20 is connected by a line 46 which extends through the tower 12, along the steel frame 40, along the fiberglass beam 42 and is electrically connected to the shield 44. Angle supports 48 serve to maintain the shield 44 in its horizontal alignment over the top surface 30 of the camera 16. As can be seen in FIG. 1, the electrical line 46 transmits solely negative ions to the shield 44. The shield 44 has a surface area at least twice the surface area of the top surface 30 of the camera 16. The shield 44 is disposed no more than two feet above the top surface 30 of the camera 16.

Figure 2:
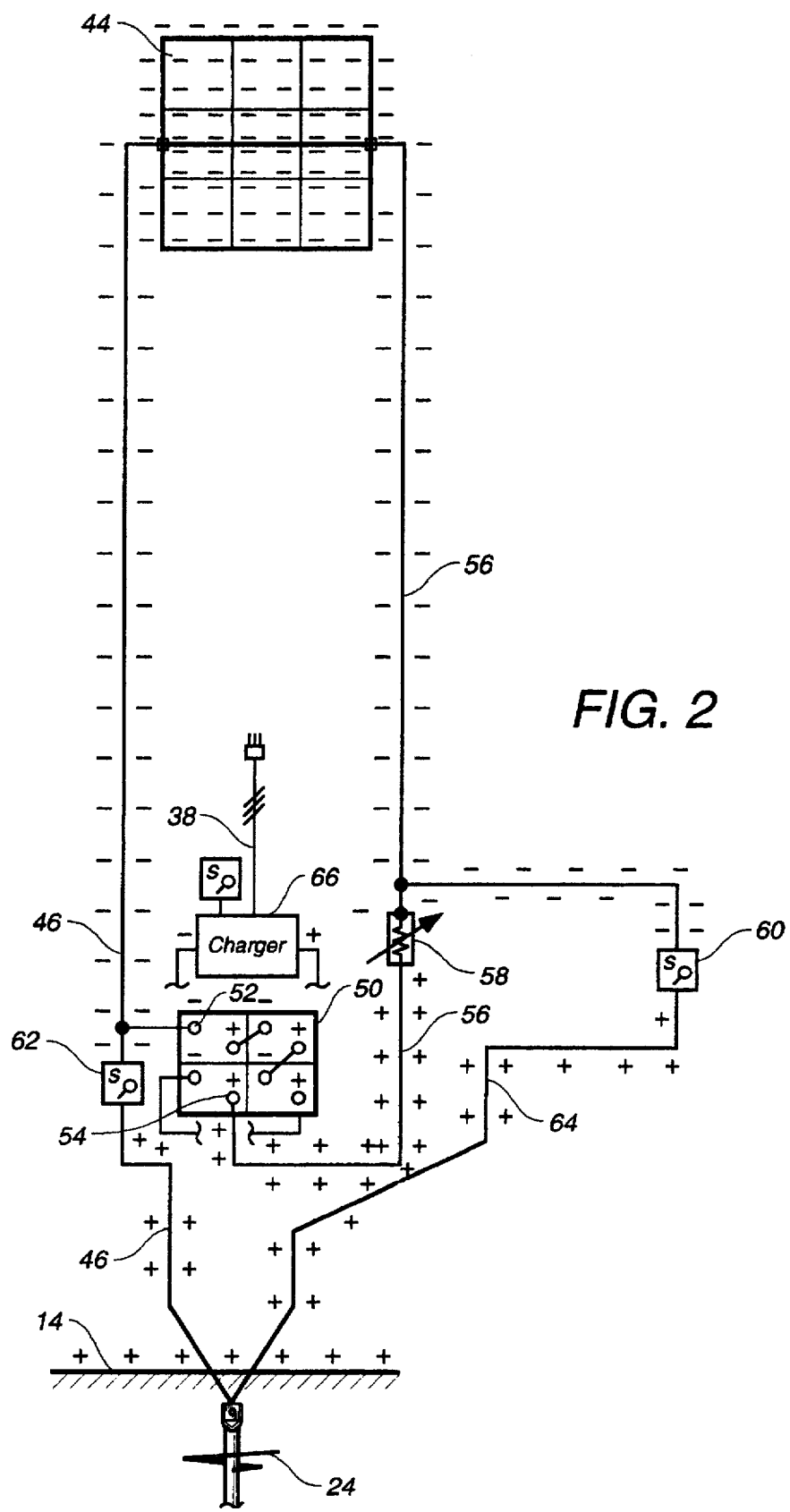
FIG. 2 is an electronic schematic showing the operation of the lightning protection device of the present invention.

FIG. 2 shows the electronics associated with the negative ion production device 20 of the present invention. In FIG. four twelve-volt batteries 50 are connected in series so as to have a 48-volt DC output. The negative terminal 52 of one of the batteries 50 is electrically connected to electrical line 46. Line 46 will extend upwardly along the tower 12 so as to be in electrical contact with the shield 44. The path of negative ions is shown by the "−" sign in the drawing of FIG. 2. As can be seen, the negative ions pass throughout the shield 44.

The positive terminal 54 of one of the batteries 50 is electrically connected to line 56. Line 56 is electrically connected to the shield 44. A resistor 58 is connected along line 56 between the positive terminal 54 of the batteries 50 and the shield 44. The resistor 58 is a 48-volt, 0 to 500 watt resistor or rheostat. The capacity of the resistor 54 should be equal to or greater than the DC output of the batteries. As such, the positive ions from the positive terminal of the batteries 50 are prevented from passing to the shield 44. A surge protector 60 is connected, in parallel, with the resistor 58 so as to prevent any positive charges from the earth 14 from entering the electrical line 56. Another surge protector 62 is installed on electrical line 46 to further prevent positive ions from entering the flow along lines 46 and 56. The surge protectors 60 and 62 serve to dump the lightning or discharge to the ground so as to prevent the lightning from affecting the circuitry, in the unlikely event that the tower is struck by lightning. It can be seen that electrical line 46 is ultimately connected to the auger 24 and is thereby grounded. Similarly, the electrical line 56 and electrical line 64 are connected to the auger 24 and are thereby grounded.

It can be seen in FIG. 2 that a battery charger 66 is provided within the enclosure 32 of the negative ion production device 20. The battery charger 66 can be connected to the plurality of batteries 50. The battery charger 66 is powered by an AC power source through the electrical line 38. The battery charger 66 is provided so as to assure that the capacity of the batteries 50 is maintained and that a sufficient charge of negative ions is always passing to the shield 44. Whenever the capacity of the batteries 50 is indicated as below a desired level, the battery charger 66 can be activated so as to suitably charge the batteries 50 to a desired level. The battery charger 66 is electrically isolated, through the batteries 50, from the shield 44.

The use of the shield 44 above the camera 16 in the lightning protection device 10 of the present invention serves to "hide" the tower 12 and the camera 16 from lightning strikes. As was stated previously, lightning is particularly attracted to positive ions. However, experiments have found that a source of positive ions, such as camera 16 and its associated AC power, can be "hidden" from lightning strikes by surrounding or covering such source of positive ions with a shield of negative ions.

Figure 3:
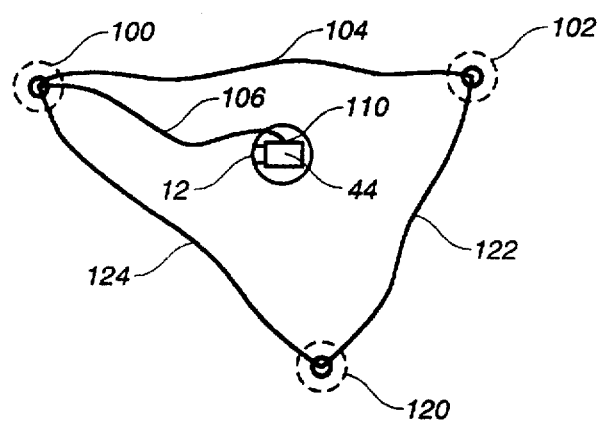
FIG. 3 is a plan view of the lightning protection device of the present invention.
Figure 4:
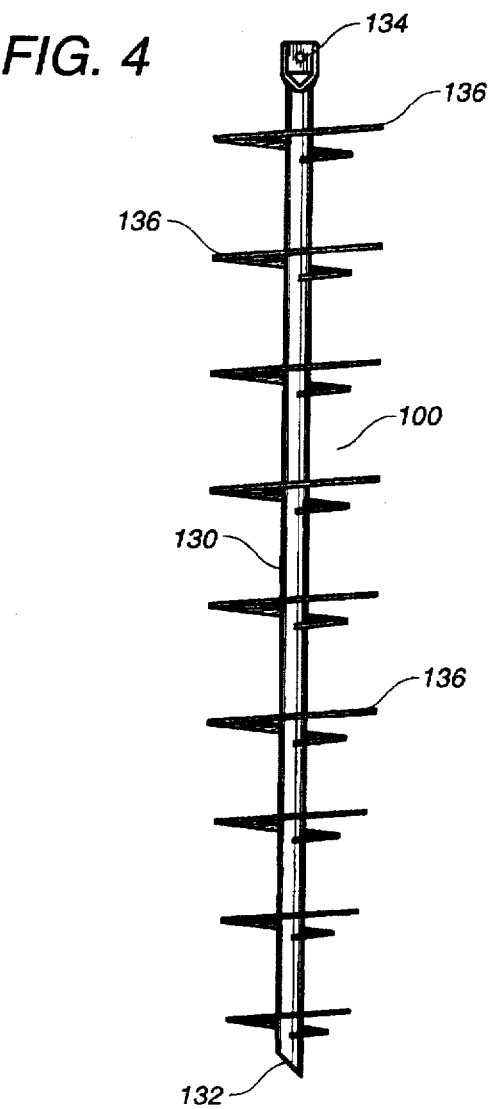
FIG. 4 is a detailed side elevational view of the auger rod used with the present invention.

FIG. 3 shows how the tower 12 is positioned around a geometric pattern of augers 100, 102, and 120. In particular, electrical line 106 will extend from the auger 100 to the base 110 of the tower 12. Electrical line 104 serves to connect the auger 100 with the auger 102. Another electrical line 122 connects the auger 102 with another auger 120. An electrical line 124 will connect the auger 120 with the auger 100. As such, the augers 100, 102, and 120 form a geometric pattern around the apparatus 10. It can be seen that the camera 16 is positioned below the shield 44 at the top of the tower 12.

FIG. 5 illustrates, in detail, the auger 100 as used in the present invention. It can be seen that the auger 100 has a central shaft 130 that extends from the pointed base 132 to the connection point 134. A plurality of spiral-shaped vanes 136 are positioned in spaced relationship longitudinally along the length of the shaft 30. Each of the spiral-shaped vanes 136 create the "digging" action of the auger 100. By rotating the auger 100, the vanes 136 will engage the earth so as to draw the auger 100 into the earth. The connection point 134 can be connected to a suitable rotational mechanism. After removal from the rotational mechanism, the connection point 134 can be used as the contact point for the electrical lines 104 or 106. As can be seen, the great surface area along each of the vanes 136 and along the shaft 130 establishes strong electrical connection between the auger 100 and the earth. A carbon electrolyte can be placed over the surfaces of the auger 100 so as to further establish a strong electrical connection.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. A lightning protection apparatus comprising:

a tower being grounded to the earth;

an electronic device mounted onto an area adjacent a top of said tower; and a negative ion production means electrically connected to said area of said top, said negative ion production means for producing solely negative ions around or over said electronic device.

2. The apparatus of claim 1, further comprising:

an auger rod engaging the earth so as to be conductively connected to the earth; and an electrical line connected to said auger rod and conductively connected to said tower.

3. The apparatus of claim 2, further comprising:

a plurality of auger rods engaging the earth so as to be conductively connected to the earth, each of said plurality of auger rods forming a geometric configuration around said tower.

4. The apparatus of claim 1, said tower being formed of a electrically conductive material, said negative ion generation means comprising:

a shield member connected to said tower and extending over said electronic device, said negative ions passing through said shield member.

5. The apparatus of claim 4, said negative ion generation means further comprising:

a DC power source having a negative terminal electrically connected to said shield member.

6. The apparatus of claim 5, said DC power source comprising:

at least one battery having a DC output of at least 48 volts.

7. The apparatus of claim 5, said negative ion generation means further comprising:

a resistor means connected to a positive terminal of said DC power source, said resistor means having a resistance capacity equal to or greater than a DC output of said DC power source, said resistor means connected in series with said shield member, said resistor means for resisting a passage of positive ions to said shield member.

8. The apparatus of claim 5, said negative ion generation means further comprising:

a charger means electrically connected to said DC power source, said charger means being powered by AC power, said charger means for recharging said DC power source.

9. The apparatus of claim 8, said charger means and said DC power source being positioned at a bottom of said tower, said DC power source having an electrical line extending to said shield member, said electrical line being electrically insulated from said tower.

10. The apparatus of claim 4, said shield member having an area at least twice a surface area of said electronic device, said shield member positioned no more than two vertical feet above said electronic device, said shield member being electrically insulated from said electronic device.

11. The apparatus of claim 10, said shield member being supported over said electronic device and from said tower by a non-conductive frame.

12. The apparatus of claim 1, said electronic device being a camera mounted onto the top of said tower, said camera being powered by AC power.

* * * * *